US010521782B2

(12) United States Patent
Gilbert et al.

(10) Patent No.: US 10,521,782 B2
(45) Date of Patent: Dec. 31, 2019

(54) SYSTEM FOR AND METHOD OF EFFECTING AN ELECTRONIC TRANSACTION

(75) Inventors: Kevin Gilbert, Milwaukee, WI (US);
Scott R. Statland, Mequon, WI (US);
Susan M. Kelling, Palmyra, WI (US);
Ian A. Lumsden, West Bend, WI (US);
Chuck J. Bram, Fox Point, WI (US)

(73) Assignee: EFUNDS CORPORATION, Milwaukee, WI (US)

( * ) Notice: Subject to any disclaimer, the term of this patent is extended or adjusted under 35 U.S.C. 154(b) by 2642 days.

(21) Appl. No.: 10/258,503

(22) PCT Filed: Apr. 12, 2001

(86) PCT No.: PCT/US01/11930
§ 371 (c)(1),
(2), (4) Date: Oct. 25, 2002

(87) PCT Pub. No.: WO01/88804
PCT Pub. Date: Nov. 22, 2001

(65) Prior Publication Data
US 2003/0061171 A1   Mar. 27, 2003

Related U.S. Application Data

(60) Provisional application No. 60/204,270, filed on May 15, 2000.

(51) Int. Cl.
*G06Q 20/12* (2012.01)
(52) U.S. Cl.
CPC .................... *G06Q 20/12* (2013.01)

(58) Field of Classification Search
CPC ............................ G06Q 20/12; G06Q 20/10
(Continued)

(56) References Cited

U.S. PATENT DOCUMENTS 5,319,542 A   6/1994 King, Jr. et al.
5,319,758 A   6/1994 Arai et al.
(Continued)

FOREIGN PATENT DOCUMENTS

EP   0690399 A2   1/1996
EP   0 690 399 A2 *   3/1996   ............. G06F 17/60
(Continued)

OTHER PUBLICATIONS

U.S. Appl. No. 09/336,930, Fergerson et al, filed Jun. 21, 1999.
(Continued)

*Primary Examiner* — Calvin L Hewitt, II
*Assistant Examiner* — Cristina Owen Sherr
(74) *Attorney, Agent, or Firm* — Finnegan, Henderson, Farabow, Garrett & Dunner, LLP

(57) ABSTRACT

A system for and method of performing a transaction between a consumer (105) and a business entity (110). The method comprising the acts of priding transaction data from a submitter (105) to a transaction facilitator (120), generating a token (130) that identifies the transaction data, storing the transaction data and the token at the transaction facilitator (120), providing the token to the submitter (105), returning the token (130) to the transaction facilitator, obtaining the stored transaction data identified by the token, and using at least a portion of the obtained transaction data to implement the transaction.

13 Claims, 5 Drawing Sheets

(58) Field of Classification Search
USPC .......................................................... 705/65
See application file for complete search history.

(56) References Cited

U.S. PATENT DOCUMENTS

| | | | |
|---|---|---|---|
| 5,412,190 A | | 5/1995 | Josephson et al. |
| 5,434,394 A | | 7/1995 | Roach et al. |
| 5,484,988 A | | 1/1996 | Hills et al. |
| 5,679,938 A | | 10/1997 | Templeton et al. |
| 5,752,582 A | | 5/1998 | Hayward |
| 5,801,366 A | | 9/1998 | Funk et al. |
| 5,809,143 A | * | 9/1998 | Hughes ........................ 705/77 |
| 5,870,456 A | | 2/1999 | Rogers |
| 5,890,137 A | | 3/1999 | Koreeda |
| 5,890,139 A | | 3/1999 | Suzuki et al. |
| 5,892,900 A | * | 4/1999 | Ginter .................. G06F 21/10 |
| | | | 726/26 |
| 5,909,492 A | | 6/1999 | Payne et al. |
| 5,918,213 A | | 6/1999 | Bernard et al. |
| 5,920,847 A | | 7/1999 | Kolling et al. |
| 5,946,669 A | | 8/1999 | Polk |
| 5,960,411 A | | 9/1999 | Hartman et al. |
| 5,966,697 A | | 10/1999 | Fergerson et al. |
| 5,974,146 A | | 10/1999 | Randle et al. |
| 5,987,132 A | | 11/1999 | Rowney |
| 5,987,140 A | | 11/1999 | Rowney et al. |
| 6,002,767 A | | 12/1999 | Kramer |
| 6,014,636 A | | 1/2000 | Reeder |
| 6,072,870 A | | 6/2000 | Nguyen |
| 6,076,166 A | | 6/2000 | Moshfeghi et al. |
| 6,078,907 A | | 6/2000 | Lamm |
| 6,115,471 A | | 9/2000 | Oki et al. |
| 6,125,352 A | | 9/2000 | Franklin et al. |
| 6,164,528 A | | 12/2000 | Hills et al. |
| 6,170,017 B1 | | 1/2001 | Dias et al. |
| 6,283,366 B1 | | 9/2001 | Hills et al. |
| 6,314,425 B1 | * | 11/2001 | Serbinis ............. G06F 21/6218 |
| 6,647,376 B1 | | 11/2003 | Farrar et al. |
| 6,970,930 B1 | * | 11/2005 | Donovan ................ H04L 29/06 |
| | | | 709/220 |
| 7,000,828 B2 | | 2/2006 | Jones |
| 7,191,151 B1 | | 3/2007 | Nosek |
| 7,194,437 B1 | | 3/2007 | Britto et al. |
| 2002/0072942 A1 | | 6/2002 | Kuykendall et al. |
| 2002/0120846 A1 | | 8/2002 | Stewart et al. |
| 2002/0178112 A1 | | 11/2002 | Goeller et al. |
| 2003/0028481 A1 | * | 2/2003 | Flitcroft ................ G06Q 20/00 |
| | | | 705/39 |
| 2003/0050892 A1 | | 3/2003 | Clynes et al. |

FOREIGN PATENT DOCUMENTS

| | | |
|---|---|---|
| EP | 0927945 | 7/1999 |
| JP | 10-105829 | 4/1998 |
| WO | 01/84517 | 11/2001 |

OTHER PUBLICATIONS

Kanell, Michael, E., "Distrust Slows Use of Internet Commerce", Austin American-Statesman Newspaper, Cybershopping, Atlanta Journal and Constitution, Apr. 20, 1997.

Kahn, Hal, "High-Tech Makes Mark on All Levels of Retail", Austin American-Statesman Newspaper, Cybershopping, San Jose Mercury News, Apr. 20, 1997.

NACHA—The Electronic Payments Association, Electronic Check Council, May 2000 (9 pages).

Convert Checks Into New Business, 1999 Deluxe Corporation, Inc. (2 pages).

A Powerful Defense Against Bad Checks, 1999 Deluxe Payment Protection Systems, Inc. (2 pages).

Business Wire, "Studio Archetype Develops Innovative On-Line Shopping Site for Time Warner: www.dreamshop.com", San Francisco, Oct. 29, 1996.

* cited by examiner

SYSTEM FOR AND METHOD OF EFFECTING AN ELECTRONIC TRANSACTION

RELATED APPLICATIONS

This patent application is a national stage filing under 35 U.S.C. 371 of International Application No. PCT/US01/11930 filed on Apr. 12, 2001, which claims the benefit of U.S. Provisional Application No. 60/204,270 filed on May 15, 2000.

BACKGROUND OF THE INVENTION

The invention relates to a system for and method of effecting an electronic transaction, and particularly to a system for and method of effecting an electronic transaction between a first entity and a second entity utilizing a third entity as a transaction facilitator.

When a consumer performs a debit transaction at a merchant's or service provider's (collectively referred to as "business entity") brick-and-mortar place of business, the consumer typically provides debit financial information and a debit password. The financial information, which includes account data, may be stored on a magnetic strip card that is scanned by a magnetic card reader (e.g., a point-of-sale device). Upon scanning the card, the consumer enters a debit password into the card reader. The information is then transmitted to a third party to perform the debit transaction. When a debit transaction is performed over the Internet, the debit information is supplied by the consumer directly to the merchant over unsecured lines, thus placing the consumer at more risk than with a conventional debit transaction.

In certain transactions, the business entity may not receive payment at the same time that the goods are shipped or that the services are performed. This often occurs where the purchase involves a payment plan requiring recurring payments. Nevertheless, the financial information is still requested prior to performing the services or prior to shipping the goods. The consumer may have a natural reluctance to provide this information to be used in an ongoing manner to effect recurring payments.

In other transactions, the business entity may require additional information not typically included in conventional debit transactions. For example, if the consumer is purchasing alcohol, the business entity may be obligated to confirm that the consumer is of legal drinking age. In other transactions, the business entity may be required to determine the consumer's place of residence. For example, the business entity may have to tax the consumer based on the consumer's place of legal domicile. The above determinations, and others like them, are difficult to determine in the context of an Internet transaction.

SUMMARY OF THE INVENTION

It would be beneficial to provide a secure system allowing a consumer to submit transaction information as part of a transaction while preventing the business entity from receiving some or all of the transaction information. In addition, it would be beneficial for the business entity to be able to verify that the consumer meets specific requirements or to use consumer specific data for certain aspects of the transaction.

Accordingly, the invention provides a third party or transaction facilitator that stores the consumer's transaction information on behalf of the consumer and provides an electronic or software based "token" to the business entity. The business entity may later submit the token (e.g., when the services are rendered or when the goods are shipped) to receive payment for goods provided or services rendered. In other transactions, the consumer may "pre-register" with the third party and receive a token. The token may then be provided to the business entity, who submits the token to receive payment. In other transactions, a party acting on behalf of the business entity may receive the token, and later submit the token to receive payment on behalf of the business entity. The token may include restrictions on how the token may be used. For example, the token may have a date restriction limiting when the token may be submitted and/or may have an amount restriction or limit.

In addition, the third party may review the consumer provided transaction information and provide specific consumer information to the business entity. For example, the third party may inform the business entity whether the consumer meets specific requirements (e.g., is a certain age). Alternatively, the consumer may provide the business entity information that is required to complete the transaction (e.g., the state that the consumer is legally domiciled in for calculating taxes).

In one embodiment, the invention provides a method of performing a transaction between a consumer and a business entity. The method includes the acts of providing transaction data from a submitter to a transaction facilitator, generating a token that identifies the transaction data, storing the transaction data and the token at the transaction facilitator, providing the token to the submitter, returning the token to the transaction facilitator, obtaining the stored transaction data identified by the token, and using at least a portion of the obtained transaction data to implement the transaction.

In another embodiment, the invention includes the act of providing encrypted data to a consumer. The encrypted data includes encrypted account specific data and encrypted consumer specific data. The invention further includes the acts of transmitting the encrypted data to a transaction facilitator as part of a transaction, and decrypting the encrypted data to produce decrypted data. The decrypted data includes decrypted account specific data and decrypted consumer specific data. The invention further includes the act of using the decrypted consumer specific data to complete the transaction.

Other features and advantages of the invention will become apparent to those skilled in the art upon review of the following detailed description, claims, and drawings.

DETAILED DESCRIPTION

Before any embodiments of the invention are explained in full detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including" and "comprising" and variations thereof herein is meant to encompass the items listed thereafter and equivalents thereof as well as additional items.

Figure 1:
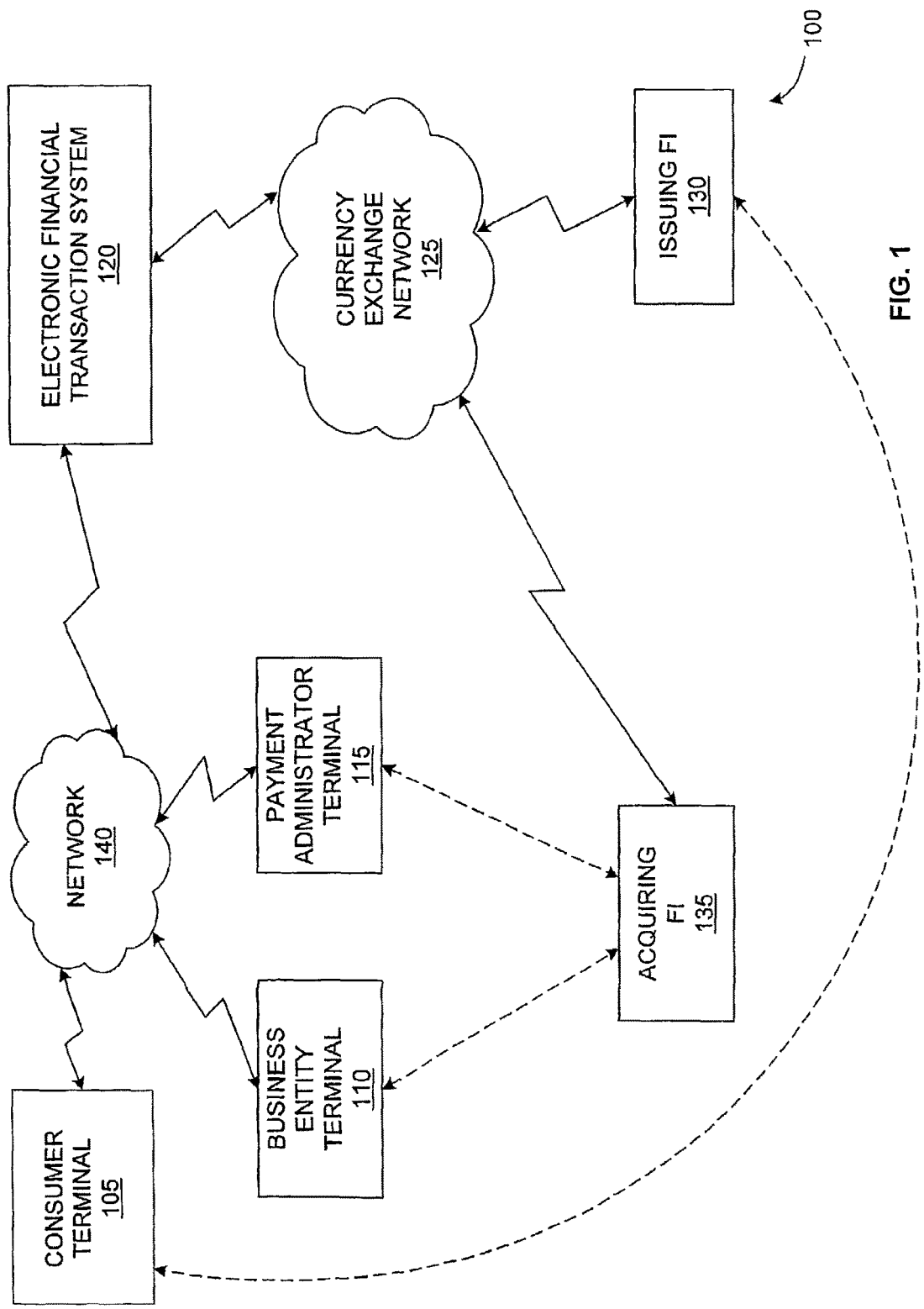
FIG. 1 is a schematic representation of a system embodying the invention.

One embodiment of a system 100 for performing a transaction between a consumer and a business entity of the invention is shown in FIG. 1. As used within this application, the consumer is any first party paying currency to a second party for the purchase or use of goods, services, or property. The business entity is any second party receiving payment from a first party for the purchase or use of goods, services or property. The transaction may be a purchase of goods, services or property, a purchase of the temporary right to the use of goods, or property, or the purchase of an expectation to receive goods, services or property. For the purposes of simplifying the detailed description, the transaction will be described as a simple purchase of goods or services. Furthermore, if the business entity is receiving the currency or funds at the time the transaction is being entered into, then that transaction is referred to as an "immediate transaction." Alternatively, if the consumer and business entity agree that a transfer of currency will occur at a later time, then the original agreement is a "set-up transaction" and the later payment is a "subsequent transaction." For some transactions, the later payment may be a repetitive payment (e.g., a monthly payment). This type of subsequent transaction is referred to as a "recurring transaction."

As shown in FIG. 1, the system 100 generally includes a consumer terminal 105, a business-entity terminal 110, a payment-administrator terminal 115, an electronic financial transaction system 120, a currency exchange network 125, an issuing financial institution (FI) 130, an acquiring financial institution (FI) 135, and a network 140. As will be become apparent below, FIG. 1 shows only one preferred embodiment of the system for performing a financial transaction.

Figure 2:
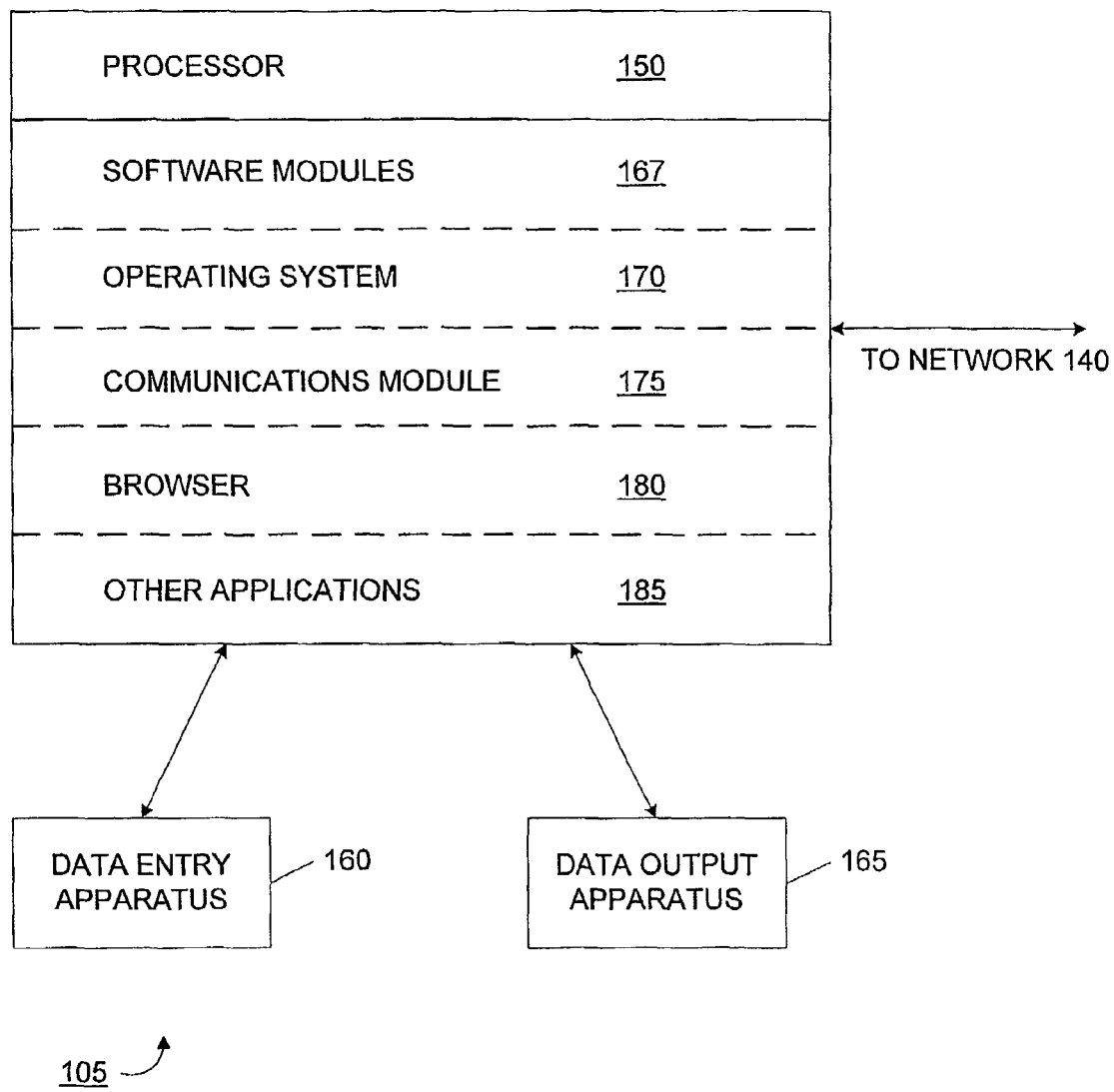
FIG. 2 is a schematic representation of a consumer terminal used in the system shown in FIG. 1.

As shown in FIGS. 1 and 2, the financial transaction system 100 includes a consumer terminal 105. The consumer terminal 105 generally includes a processor 150, one or more memory units (not shown), one or more data entry apparatus 160, and one or more data output apparatus 165. The processor 150 interprets and executes instructions stored as one or more software modules 167. The data entry apparatus 160 provides an interface for receiving data provided by the consumer. The data entry apparatus 160 may be a keyboard, a touch screen, a magnetic-disc drive, a CD-ROM drive, a DVD-ROM drive, a scanner, a communication system for receiving data from another device, etc. The data output apparatus 165 provides an interface for communicating data from the consumer terminal 105 to the consumer. The data-output apparatus 165 may be a visual display device (e.g., a monitor), a hard-copy device (e.g., a printer), a magnetic disc drive, a CD-ROM write drive, a DVD-ROM write drive, an audio speaker, a communication system for transmitting data to another device, etc.

The software modules 167 include an operating system 170, a communications module 175, a browser 180, and other applications 185. The operating system 170 includes software that controls the allocation and use of hardware resources of the consumer terminal 105. The communications module 175 includes hardware and associated software for providing communications between the consumer terminal 105 and the network 140. The browser 180 includes software allowing the consumer to view the content provided via the network 140. The other applications 185 include applications for controlling the data entry apparatus 160 and the data output apparatus 165. Other functions performed by the consumer terminal 105 will become apparent in the description below.

Although only one consumer terminal 105 is shown, the system 100 may include multiple consumer terminals 105. A suitable consumer terminal 105 is any personal computer having a Windows brand operating system and a Netscape brand browser. Other suitable consumer terminals 105 include kiosks, personal data assistants, hand-held computers, laptop computers, videophones, Internet appliances, and similar devices. Additionally and as required in other financial transaction systems, other devices may be used in place of the consumer terminal 105. For example, in one embodiment of the invention, a telephone allowing the consumer to communicate with a payment administrator may be used in place of the consumer terminal 105.

Figure 3:
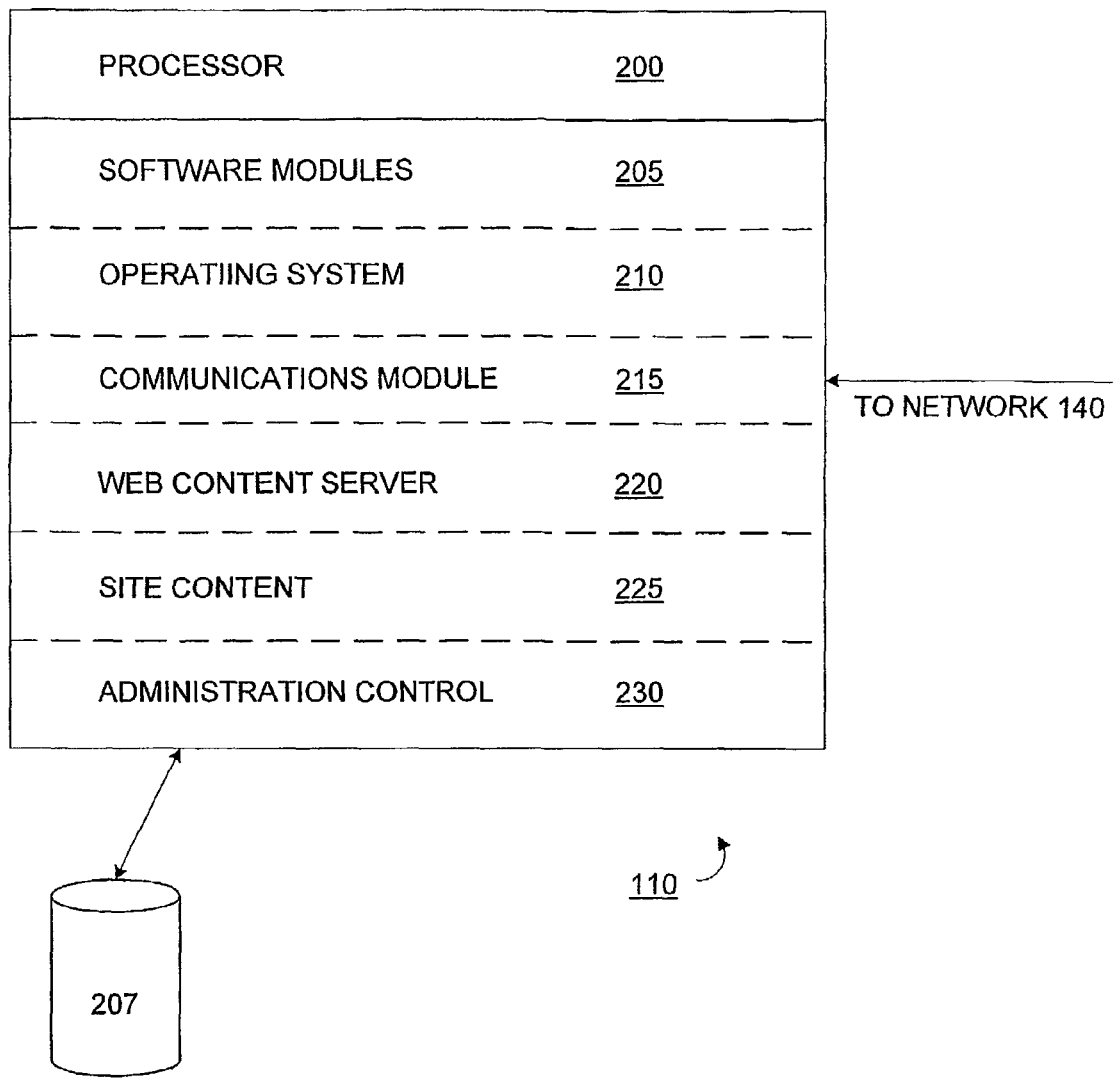
FIG. 3 is a schematic representation of a business entity terminal used in the system shown in FIG. 1.

As shown in FIGS. 1 and 3, the system 100 further includes a business entity terminal 110. The business terminal 110 includes one or more processors 200 and one or more memory units (not shown) that together provide a platform for hosting a web site at which consumers can purchase goods or services. The processor 200 interprets and executes instructions stored as one or more software modules 205.

The software modules 205 include an operating system 210, a communications module 215, a web content server 220, site content 225, and administration control 230. The operating system 210 includes software that controls the allocation and usage of hardware resources of the business entity terminal 110. The communications module 215 includes hardware and associated software for providing communications between the business entity terminal 110 and the network 140. The web content server 220 generates the business-entity web site for selling goods or services with content provided by the site content 225. The administration control module 230 provides administration support (e.g., billing or account services) for the business entity terminal 110. In addition, the memory units may further include one or more databases 207 for storing data. Other functions performed by the business entity terminal 110 will become apparent in the description below.

Although only one business entity terminal 110 is shown, the system 100 may include multiple business-entity terminals. A suitable business entity terminal 110 for the invention is a Sun Enterprise 420R brand server with a Solaris brand operating system and an Apache brand web server. Other business entity terminals may be used and, similar to the consumer terminal 105, other devices may be used in place of the business entity terminal. For example, in some embodiments of the invention, any business entity operated device for receiving a token (discussed below) may be used in place of the business entity terminal.

Figure 4:
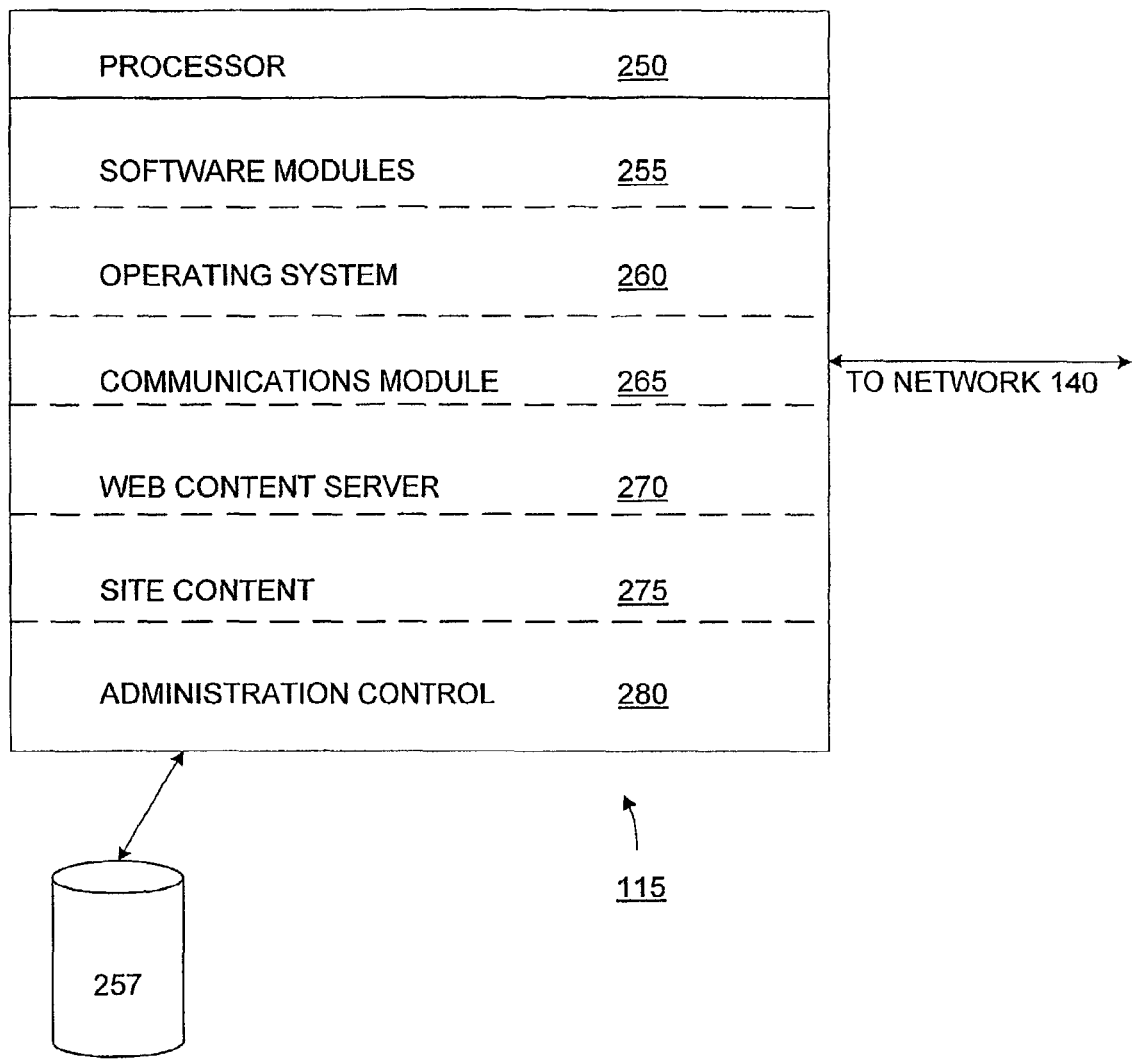
FIG. 4 is a schematic representation of a payment administrator terminal used in the system shown in FIG. 1.

As shown in FIGS. 1 and 4, the system 100 further includes a payment administrator terminal 115. The payment administrator terminal 115 includes one or more processors 250 and one or more memory units (not shown). The payment administrator terminal 115 acquires transaction data from the consumer (e.g., the consumer terminal 105) or the business entity (e.g., the business entity terminal 110), and communicates with the electronic financial transaction system 120 for completing a transaction. In some embodiments of the invention, the payment administrator terminal 115 communicates with the electronic financial transaction system 120 on behalf of the consumer. In other embodiments of the invention, the payment administrator terminal 115 communicates with the electronic financial transaction system 120 on behalf of the business entity. In yet other embodiments of the invention, the payment administrator terminal 115 communicates with the electronic financial transaction system 120 on behalf of both the consumer and the business entity. In even yet other embodiments of the invention, the payment administrator terminal 115 is not part of the transaction (e.g., either the consumer or the business entity directly communicates with the electronic financial system 120). Unless specified otherwise, the payment administrator terminal 115 communicates with the electronic financial system 120 on behalf of the business entity.

Referring to FIG. 4, the processor 250 interprets and executes instructions stored as one or more software modules 255. The software modules 255 include an operating system 260, a communications module 265, a web content server 270, site content 275, and administration control 280. The operating system 260 includes software that controls the allocation and usage of hardware resources of the payment administrator terminal 115. The communications module 265 includes hardware and associated software for providing communications between the payment administrator terminal 115 and the network 140. The web content server 270 generates a payment administration web site for acquiring transaction data from the consumer terminal 105 on behalf of the administrator with content provided by the content site 275. The administration control module 280 provides administration support (e.g., billing or account services) for the payment administrator terminal 115. In addition, the memory units may further include one or more databases 257 for storing data. Other functions performed by the payment administrator terminal 115 will become apparent in the description below.

A suitable payment administrator terminal 115 for the invention is a Sun Enterprise 420R brand server with a Solaris brand operating system and an Apache brand web server. Other payment administrator terminals 115 may be used and, similar to the business entity terminal 110, other devices may be used in place of the payment administrator terminal 115. An example payment administrator that provides the services of the payment administrator terminal 115 is the Electronic Payment Exchange (EPX) brand payment administrator.

Figure 5:
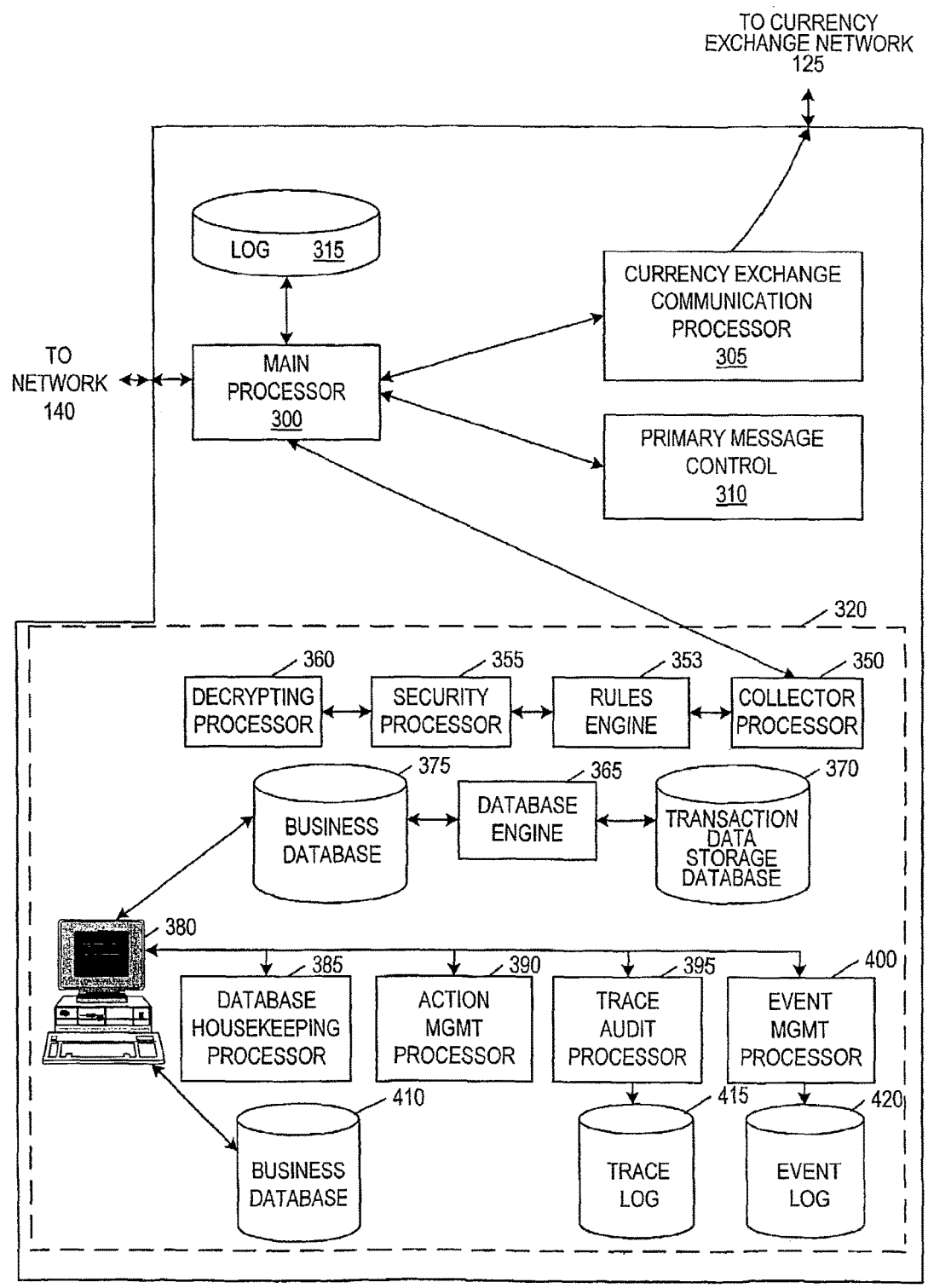
FIG. 5 is a schematic representation of an electronic financial transaction system used in the system shown in FIG. 1.

As shown in FIGS. 1 and 5, the system 100 includes an electronic financial transaction system 120. In general, the electronic financial transaction system 120 acts as a transaction facilitator. The electronic financial transactions system 120 receives transaction data (discussed below) from a submitter (e.g., the consumer terminal 105, the business entity terminal 110, payment administrator terminal 115); generates a token (discussed below) that identifies the transaction data; stores the transaction data and the token; provides the token to the submitter, receives the token from the submitter, obtains the stored transaction data identified by the token; and uses at least a portion of the obtained transaction data to implement a financial transaction (discussed below).

As shown in FIG. 5, the electronic financial transaction system 120 generally includes a main processor 300, a currency exchange communications processor 305, a primary message control 310, a log 315, and a financial data storage system 320. The main processor 300 interprets and executes instructions stored as one or more software modules for controlling the flow of data within the electronic financial transaction system 120. The currency exchange communications processor 305 interprets and executes instructions for controlling communications between the financial information storage system 320 and the currency exchange network 125. The primary message control 310 interprets and executes instructions for preparing requests (discussed below) to be transmitted to the issuing FI 130 and/or the acquiring FI 135 via the currency exchange network 125. The log database 315 stores a record of each transaction implemented. The transaction may be a request for information, a request to debit or credit a financial account or a request to add funds to a financial account. For the embodiment shown, the financial data storage system 320 generates a token that identifies the transaction data, stores the transaction data and the token, and obtains the stored transaction data identified by a returned token. Of course, the number of processors and the number of databases shown may vary.

As shown in FIG. 5, the financial data storage system 320 includes a collector processor 350, a rules engine 353, a security processor 355, a decryption processor 360, a database engine 365, a transaction data storage database 370, and a business database 375. The collector processor 350 interprets and executes instructions stored as one or more software modules for communicating with the main processor 300, for verifying the transaction is one that can be processed by the financial data storage system 320, and for translating the data, if necessary, to a format capable of being used by the financial data storage system 320. The rules engine 353 interprets and executes instructions stored as one or more software modules for obtaining and analyzing transaction data based on transaction parameters (discussed below). The transaction parameters may have been previously set or may have been transmitted as part of the current transaction being processed. The rules engine 353 also interacts with the database engine 365 to obtain data from the databases 370 and 375. The security processor 355 interprets and executes instructions stored as one or more software modules for receiving data from the rules engine 355, for formatting the data for transmission to the decryption processor 360, and for obtaining data from the decryption processor 360. The decryption processor 360 interprets and executes instructions stored as one or more software modules for decrypting received encrypted data. For the embodiment shown, the decryption processor 360 is a Network Security Processor (NSP) manufactured by the Atalla Security Group of Compaq Computers. The decryption processor 360 includes one or more processors and one or more memory modules. The database engine 365 interprets and executes instructions stored as one or more software modules in memory for controlling the reading and writing of data to the transaction data storage database 370 and the business storage database 375.

The transaction data storage database 370 stores transaction data and a token assigned to the transaction data. The transaction data identified by the token is recalled in subsequent or latter transactions. In addition, the stored transaction data may be updated from time-to-time (e.g., when a subsequent or recurring transaction is performed as is discussed below).

The business database 375 stores security keys used by the decryption processor 360. The security keys are identified by an encrypted data identifier (discussed below), which has been previously provided to the electronic financial system 120 by an encrypted data issuer (e.g., the issuing bank). For example and in one embodiment of the invention, the issuing FI 130 issues encrypted financial data stored on a SAFE DEBIT brand CD-ROM to the consumer. The encrypted financial data has a corresponding security key allowing for the encrypted financial data to be decrypted. The security key is provided from the issuing FI 130 to the operator of the electronic financial system 120 and is stored in the business database 375. In order to recall the proper key, the CD-ROM includes a CD-ROM identifier (e.g., a CD-ROM number) that associates the encrypted data on the CD-ROM to the security key. The encrypted data identifier (e.g., the CD-ROM identifier) is also stored at the business database 375. Thus, when the financial data storage system 320 receives encrypted data and an associated encrypted data identifier, the financial data storage system may recall the proper key. As will be discussed below, the encrypted data may be stored on other computer readable media. Additionally, for some embodiments of the invention, the encrypted data identifier may not be required (e.g., when the transaction does not include any encrypted data).

The business database 375 further contains transaction parameters not specific to the pending transaction. For example, the issuing FI 130 may request that all transactions performed with the issuing FI 130 as the issuing FI of record include a specific parameter. For a specific example, the issuing FI 130 may require that only transactions less than $10,000 be facilitated by the electronic financial transaction system 120. Other parties to the transaction (e.g., the acquiring FI 135, the payment administrator 115, etc.) may require non-transaction specific transaction parameters included in the business database 375.

One skilled in the art would realize that the functions of each processor 350, 353, 355, 360 and 365 may be divided among any number of processors. For example, the functions of the database engine 365 may be combined with the rules engine 353. Alternatively, the database engine 365 may be further broken into two separate database engines: a first database engine for the business database 375 and a second database engine for the financial data storage database 370. Similarly, one skilled in the art would realize that the databases 370 and 375 may be combined into one database or broken into further multiple databases. Even further yet, the functions performed by the financial data storage system 320 may be performed by other processors of the electronic financial transaction system (e.g., main processor 300).

The financial data storage system 320 further includes one or more processors and one or more databases for ancillary functions. The financial data storage system 320 further includes a database configuration command and control terminal 380, a database housekeeping processor 385, an action management processor 390, a trace/audit processor 395, an event management processor 400, a system database 410, a trace log 415 and an event log 420. The database housekeeping processor interprets and executes instructions stored as one or more software modules for maintaining the business database 375 and the financial data storage database 370. For example, if the financial data storage database 370 is too large, then the database housekeeping processor 385 archives or erases old or obsolete data. The event management processor 400 interprets and executes instructions stored as one or more software modules for recording errors in the event log 420 when errors arise. The trace/audit processor 395 interprets and executes instructions stored as one or more software modules for tracing the occurrence of certain events and for storing the events in the trace log 415. The trace log 415 informs an operator how the financial data storage system 320 is performing (e.g., is the system at capacity or are a large number of errors occurring?). The action management processor 390 interprets and executes instructions for determining the severity of an error. For example, the action management processor 390 determines whether a failure is a minor failure, a serious failure or a fundamental failure. Based on the type of failure, the action management processor 390 may allow the transaction to continue while noting the failure, may stop the transaction from occurring, or may "shut-down" the financial data storage system 320. The database configuration command and control terminal 380 allows an operator to configure and control the financial data storage system 320. Of course, the terminal 380 may be one or more operation consoles. The system database 410 defines or configures the hardware of the financial data storage system 320. Of course, other ancillary functions can be added, or one or more ancillary may removed or combined with other ancillary functions.

An example electronic financial transaction system 120 is the PAYMENT WAREHOUSE SYSTEM brand financial transaction system maintained by eFunds Corporation. The PAYMENT WAREHOUSE SYSTEM brand financial transaction system includes a Tandem Himalaya machine sold by Compaq and an A10000E NSP manufactured by the Atalla Security Group of Compaq Computers. In various embodiments of the invention, the functions of the main processor 300, the currency exchange processor 305 and the financial information storage system 320 may be combined into one processor. Similarly, the log database 315 and the transaction data storage database 370 may be combined into one database. Even further, the functions of the Atalla A10000E system may be performed by the other processors shown. Even further yet, the functions performed by the financial data storage system 320 may be performed by other processors of the electronic financial transaction system 120 (e.g., main processor 300).

As shown in FIG. 1, the system 100 includes a currency exchange network 125. The currency exchange network 125 is a network that provides transaction communications between the electronic financial transaction system 120, the issuing FI 130 and the acquiring FI 135. The communication may be a request to remove or add funds in an account at the issuing FI 130 or the acquiring FI 135. Alternatively, the communication may be for a request for information from either the issuing FI 130 and/or the acquiring FI 135. An example of a currency exchange network 125 is an electronic funds transfer (EFT) network such as the Legacy exchange network (e.g., TYME, STAR, NYCE, etc.).

The issuing FI 130 is a financial institution that maintains a financial account on behalf of the consumer. The consumer's financial account may be a debit account, a credit account, a money market account, or any other type of demand/deposit account. The acquiring FI 135 is a financial institution that maintains a financial account on behalf of the business entity. The business entity's financial account may be a debit account, a credit account, a money market account, or any other type of demand/deposit account. In some embodiments of the invention, the payment administrator 115 may communicate with the acquiring FI 135. In other embodiments of the invention where the payment administrator terminal 115 acts on behalf of the business entity, the acquiring FI 135 may be the payment administrator terminal's FI.

The network 140 is a packet-switch-based network based on protocols, and may include wire and/or wireless connections. A network 140 suitable for use in the invention is the Internet. In other embodiments (not shown), the network 140 may be any communications network and may include multiple different types of communication networks.

Having described the basic architecture of the system 100, different embodiments of operation will be explained below. For the embodiment shown in the figures, the consumer accesses the network 140 (e.g., the Internet) via the consumer terminal 105. The consumer navigates the Internet by seamlessly linking from web page to web page as is well known in the art. At some point in time, the consumer accesses the business entity web site provided by the business terminal 110. The consumer navigates through the business entity web site to view the content of the site 225 as is well known in the art. For example, the web site may be a web site for purchasing goods or services and the consumer can view the goods or services that are for sale.

When the consumer requests to enter into a transaction, the consumer is seamlessly linked to a web page provided by the payment administrator terminal 115. The web pages provided by the payment administrator terminal 115 may have a style substantially similar to the business entity web site. A similar web page design provides an appearance to the consumer that the consumer is still within the business entity web site. Alternatively, the web page may identify the payment administrator informing the consumer they are at a different web server 220. In an alternative embodiment, when the consumer requests to purchase a good or service, the consumer remains at the business entity web site. In still another embodiment, the payment administrator terminal 115 may provide the business entity's web site on behalf of the business entity. In other embodiments, the consumer may communicate with a payment administrator by communication networks other than the Internet, and that communication is prior to communicating with the business entity. Variations of the embodiments described above are also possible.

In the embodiment shown in the figures, the payment administrator terminal 115 obtains transaction data via the Internet on behalf of the business entity. The transaction data may include encrypted data, at least one encrypted data identifier, a consumer-supplied password, a business entity identifier (e.g., a business entity name), a trace number, a transaction date, a transaction time, acquiring FI data, transaction parameters, and other data as specified by the issuing FI 130. For example, the payment administrator terminal 115 may transmit software to the consumer terminal 105 that interacts with the consumer terminal 105 to acquire the transaction data, including the encrypted data. The encrypted data is data stored on a computer readable media and include encrypted consumer specific data and encrypted financial account data. Example consumer specific data include a consumer name, a consumer postal address, a consumer residency or legal domicile (if different than the address), at least one consumer password, a date of birth of the consumer, an age of the consumer (if the date of birth is not provided), an email address, a citizenship of the consumer, etc. Example financial account data include data relating to the consumer's account at the issuing FI (e.g., a routing/transit number for the FI, an account number at the issuing FI, an account password for performing an action within the account, etc.). Additional data may be included as part of the encrypted data. The computer readable media may be a CD-ROM, a DVD-ROM, a magnetic storage media (e.g., a magnetic-disc), a memory unit of the consumer terminal (e.g., a hard-drive of the PC), etc. In the embodiment described herein, the encrypted data is stored on a SAFE DEBIT brand CD-ROM. The encrypted data identifier allows the electronic financial transaction system identify who issued the encrypted data and identifies the encrypted data. For example, it may identify the issuing FI that issued the CD-ROM and identify the CD-ROM.

The consumer-supplied password verifies that the correct consumer is submitting the encrypted data. As will be discussed below, when the encrypted data is decrypted, the decrypted password may be compared to the consumer-supplied password for verification. The business entity identifier identifies who is receiving the funds.

The trace number allows the payment administrator terminal 115 to identify the transaction for later reconciliation. For example, the electronic financial transaction system 120 may provide an outcome response to the payment administrator terminal 115 that also includes the trace number. The payment administrator terminal 115 matches the response with the transaction by the trace number. The transaction date and time are also used for further identifying the transaction.

The acquiring FI data identify the account receiving the funds. The acquiring FI data may include a routing/transit number for the acquiring FI and an account number within the acquiring FI. The transaction parameters are the agreed upon terms of the transaction as established between the business entity and the consumer. Example transaction parameters include amount, type of transaction (e.g., immediate, set-up, subsequent, or recurring), date restrictions (if setting-up for a subsequent transaction), recurrence restrictions (if setting-up for a recurring transaction), and other agreed upon terms. The transaction data may be obtained from the consumer terminal 105, the business entity terminal 110, a combination of both terminals 105 and 110, and/or originated at the administrator terminal 115. Of course, additional transaction data may be provided and not all of the financial transaction data may be required for all transactions.

Upon receipt of the transaction data, the payment administrator terminal 115 collects the data, organizes the data and forwards the data to the electronic financial transaction system 120. When the electronic financial transaction system 120 receives the transaction data, the system identifies the transaction type, processes the transaction, and transmits the outcome or necessary data to the interested entities or terminals.

Specifically, for the embodiment shown in the figures, the main processor 300 receives the financial transaction data and formats the data. For example, the data may be converted into a standard ISO 8583 format. The main processor 300 then verifies that the transaction is of a type that can be processed by the electronic financial transaction system 120. If the transaction is one that can be processed by electronic financial transaction system 120, then the main processor 300 provides the transaction to the financial data storage system 320. If the transaction is not a transaction that can be processed by the electronic financial transaction system 120, then the transaction is logged and is returned to the payment administrator terminal 115, the business entity terminal 110, and/or the consumer terminal 105 with a message stating that it cannot process the transaction.

When the financial data storage system receives the transaction data from the main processor 300, the data is provided to the collector processor 350. The collector processor 350 verifies that the transaction is one that can be processed by the financial data storage system 320 and verifies that the data is properly formatted. If the transaction is a proper transaction and is intact, then the financial transaction data proceeds to the rules engine 353. If the transaction is not a proper transaction or if any data is missing or corrupted, then the collector processor 350 returns the data to the main processor 300 for logging the transaction and returns a denial message to the proper parties.

When the rules engine 353 receives the transaction, the rules engine 353 processes the transaction by establishing rules for the engine 353 to follow. The rules are based on parameters supplied to the rules engine 353. The parameters may include transaction parameters established between the consumer and the business entity; may include business entity parameters, acquiring FI parameters or issuing FI parameters stored in the business data database; or may include system parameters that are set by the financial data storage system 320. The rules engine 353 first determines the transaction type (e.g., initial transaction, set-up transaction, subsequent transaction or recurring transaction).

Immediate Transaction

If the transaction is an immediate transaction, then the financial data storage system 320 decrypts any encrypted data (as is discussed below) and returns the transaction to the main processor 300. The electronic financial transaction system 120 then processes the transaction similar to when the main processor 300 receives a subsequent transaction (discussed below) from the financial data storage system 320. One skilled in the art can draw similarities between the immediate transaction and the other transactions discussed further below. Therefore, the immediate transaction is not discussed in further detail Set-Up Transaction If the transaction is a set-up transaction, then the rules engine 353 determines whether the transaction data includes encrypted data. If the transaction includes encrypted data, then the rules engine 353 provides the encrypted data identifier to the database engine 365. As described herein, the rules engine 353 provides only the necessary data to either the database engine 365 or the security processor 355 to perform the required task. However, the rules engine 353 may provide or transfer all data to the database engine 365 or the security processor 355 to perform the required task. Variations of either method are also possible.

When the database engine 365 receives the encrypted data identifier, the database engine 365 uses the identifier to access issuer data. For example, the issuer data may include the identity of the issuing FI and/or a security or decryption key for decrypting the encrypted data. Of course, other issuer data may be obtained. If the encrypted data is not recognized then the database engine 365 informs the rules engine 353. This results in the rules engine returning the transaction to the main processor 300. The electronic financial transaction system 120 then logs the transaction and returns the transaction to the payment administrator terminal 115, the business entity terminal 110, and/or the consumer terminal 105 with a message stating the transaction cannot process the transaction.

In another embodiment of the invention, the database engine 365 may identify who issued the encrypted financial data, but does not have a decryption key (e.g., another electronic financial transaction system 120 has the decryption key). For this embodiment, the transaction data is returned to the main processor 300 via the rules engine 353. The main processor 300 may then forward the financial transaction data to an electronic financial transaction system 120 that can decrypt the data. In other embodiments of the invention, the encrypted data may have more than one identifier and, consequently, more than one decryption key.

Once the issuer data (including the decryption key) is obtained, the issuer data is provided to the rules engine 353 and combined with the transaction data. The rules engine 353 then provides the encrypted data and the decryption key to the security processor 355. The security processor 355 formats the received data and transmits the data to the decryption processor 360. The decryption processor 360 uses the decryption key to decrypt the encrypted data to produce decrypted data (e.g., consumer specific data, financial account data, email address, date of birth, residency, etc.). The decrypted data is then returned to the rules engine 353 via the security processor 355. The rules engine 353 combines the decrypted data with existing transaction data.

The decrypted data include data that is necessary to complete the transaction and includes data that the consumer does not want to provide directly to the business entity or payment administrator. For example, the consumer may not want to provide financial account data directly to the business entity. Rather, the consumer provides the encrypted data to the business entity (or a payment administrator working on behalf of the business entity) who provides the encrypted data to a transaction facilitator (e.g., the electronic financial transaction system 120) for decryption. The transaction facilitator decrypts the data, stores the data (the encrypted data and/or the decrypted data), assigns a token to the data, and returns the token and data necessary to complete the transaction to the business entity. The token may then be used for subsequent or recurring transactions.

In addition, the encrypted data may include a password used for verifying that the true owner of the encrypted data is providing the encrypted data. For example, the decrypted data may include a decrypted password that is compared to a non-encrypted, consumer-provided password. If the passwords match, then the electronic financial transaction system assumes the proper consumer is providing the data. Another security feature of the encrypted data is including a consumer email address in the encrypted data. After the data is decrypted, an electronic mail message may be provided to the consumer terminal 105 informing the consumer that the encrypted data is being used for a transaction.

Further, the encrypted data may include data for completing the transaction. For example, the consumer specific data may include a mailing address for mailing goods, a place of residence for calculating taxes, a citizenship for preventing exportation of various goods, a phone number for voice confirmation, and a date of birth for age verification, etc. Some of the consumer specific data may be forwarded to the business entity. For example, the mailing address may be forwarded to the business entity thereby eliminating the need for the business entity to obtain the information from the consumer. The date of birth may be used by the business entity to verify that the consumer is of legal age to perform the transaction (e.g., is older than twenty-one for purchasing alcohol). In such a scenario, the electronic financial transaction system may forward a confirmation to the payment administrator that the consumer is a valid age for completing the transaction. Alternatively, the transaction may include a parameter to reduce the transaction price based on the consumer age (e.g., is older than sixty-five). Of course, not all encrypted data may be required for the pending transaction and other information may be added to the encrypted data. For example, the encrypted data may include a special message (e.g., is a member of an organization) for informing the electronic financial transaction system 120 that the consumer may purchase an item not otherwise available to the general public. For another example, the encrypted data may include a license number for allowing the consumer to perform a specialized transaction (e.g., renewing the license) with an agency (e.g., a government agency).

If the consumer provided password matches the decrypted password and the consumer meets parameters regarding the consumer's demographics (e.g., is of proper age), then the rules engine 353 proceeds to generate and assign a token to the data. Otherwise, the rules engine returns the transaction to the main processor 300 for logging the transaction and returning the transaction to the proper parties stating it cannot process the transaction. As used herein, the token signifies or identifies the transaction data. The token may be unique by itself, or may be used in combination with another piece of data. For example, the embodiment described herein uses a generated number and the encrypted data identifier to create a token for identifying the transaction data.

The decrypted financial data further include currency exchange network data. These data provide the identity of the issuing FI to the electronic financial transaction system. The currency exchange network data include a routing/transit number of the issuing FI 130, an account number or other information identifying the account within the issuing FI 130, the card issuer, an expiration date of the card, and a service code identifying the type of card. Of course, the currency exchange network data may include other data and not all data is required for other embodiments.

For some embodiments, the transaction data does not include encrypted data. For example, the consumer may interact with a trusted payment administrator who submits the unencrypted transaction data to the electronic financial transaction system 120. For this type of transaction, the financial data storage system does not need to decrypt any data. However, similar to above, a token is assigned to the transaction data. This token may then be provided to a business entity (or a payment administrator acting on behalf of the business entity) as part of a subsequent or recurring transaction.

After generating a token, the rules engine 353 provides the transaction data to the database engine 365. The database engine 365 stores the transaction data (including the encrypted data identifier) and the token in the transaction data storage database 370. Of course, not all of the transaction data is required to be stored in the transaction data storage database 370. For example, it is not necessary to store both the decrypted data and the encrypted data.

After the transaction data is stored, the rules engine 353 transmits the transaction data, the decrypted financial data and the token to the main processor 300. Of course, the main processor 300 may retain some of the transaction data, and therefore, all data need not be provided a second time.

The transaction data (including the decrypted transaction data) and the token are provided from the main processor 300 to the primary message control processor 310. In other embodiments, not all of the transaction data need be transferred to the primary message control processor 310. However, for the embodiment described herein, when data are exchanged between processors 300, 305 and 310, all data are exchanged.

The primary message control 310 analyzes the data within the transaction, identifies that the transaction is a set-up transaction, and creates a request to the issuing FI 130. For example, the request may include an inquiry querying whether the consumer's account is present at the issuing FI 130. In addition, the request may inquire as to whether sufficient funds are present within the account. Once the request is created, the primary message control 310 determines how the transaction should be routed within the current exchange network 125 (e.g., what is the best route to the issuing FI). The primary message control 310 returns the request, the route, the transaction data, and the token to the main processor 300. The main processor 300 forwards all of the data to the currency exchange communications processor 305.

The currency exchange communications processor 305 then submits the request and the route to the currency exchange network 125. The request is transmitted to the issuing FI 130 as is known within the art. Upon receiving the request, the issuing FI 130 prepares a response for the request (e.g., whether the consumer's account is a valid and open account with sufficient funds to satisfy the transaction). The response or authorization decision of the issuing FI 130 is transmitted back to the currency exchange communications processor 305 via the currency exchange network 125. The currency exchange communications processor 305 then returns the response to the main processor 300. The main processor 300 analyzes the result and informs the necessary parties (e.g., the payment administrator terminal 115, the business entity terminal 110 and/or the consumer terminal 105) of the result. In addition, the token is returned to the payment administrator terminal 115 for subsequent or recurring transactions. Enough information is sent to each party to allow each party to reconcile its records. For example, the payment administrator terminal 115 may receive data including the encrypted-data identifier, the trace number, the token, the submitted date, the submitted time, the parameters of the transaction, etc. Of course, additional information may be returned to the payment administrator terminal 115 including a response code (e.g., whether the consumer exists or whether the transaction took place), consumer specific data obtained from the encrypted financial information (e.g., the mailing address for sending goods, whether the consumer is of age to perform the transaction, etc.), etc. However, not all transaction data is provided to each party. For example, the payment administrator terminal 115 does not receive the financial account data.

Once the payment administrator terminal 115 receives the response (including the token), then the data may be forwarded to the business entity for resubmission by the business entity or may be retained by the payment administrator terminal 115. If the issuing FI 130 returns a denial or negative confirmation, then the denial is also returned to the rules engine 353. The rules engine 353 receives the denial and logically erases the stored transaction data and the corresponding token within the transaction data storage database 370. After the result is sent, the log 315 is updated for record and billing purposes.

For the embodiment shown in the figures, the transaction data is provided from the consumer terminal 105 or the business entity terminal 110 to the payment administrator, which is acting on behalf of the business entity. However other embodiments are envisioned. For example, the consumer may register financial information directly with a payment administrator acting on behalf of the consumer. For example, the consumer may directly contact the payment administrator and provide set-up transaction data to the payment administrator. The payment administrator provides the transaction data to the electronic financial transaction system 120 and receives a token in response thereto. The token is then forwarded to the consumer. At a later time, the consumer submits the token to a business entity (or a payment administrator acting on behalf of the business entity), which provides the token and subsequent transaction data (discussed below) to the electronic financial transaction system 120. For a specific example, the consumer may telephone the payment administrator and register a credit card number and transaction parameters with the administrator. The telephone call results in the consumer receiving a token assigned to the credit card number. The token may then be submitted to a business entity in place of the credit card number for performing a subsequent transaction. This provides extra security to the consumer that the credit card will not be compromised. The parameters assigned to the token may specify that the token only be used for five transactions up to a specified dollar amount. In other words, the electronic financial transaction system 120 is able to register credit card details and be able to initiate credit card purchases based on the registered details. Other types of transactions and variations of the system are possible Subsequent and Recurring Transactions For the embodiment shown in the drawings, the payment administrator terminal 115, which is acting on behalf of the business entity, submits the earlier received token when an agreed upon condition is fulfilled triggering the submission. For example, in a subsequent transaction, the condition may be that the business entity can only request for transfer of funds when the transacted goods are shipped. As another example, in a recurring transaction, the condition may be the passage of a period of time (e.g., a monthly payment is due). When submitting the subsequent or recurring transaction, the payment administrator transmits the token and subsequent or recurring transaction data to the electronic financial transaction system 120. The token informs the electronic financial transaction system 120 that set-up transaction data necessary to complete the transaction is stored at the transaction data storage database 370. The subsequent or recurring transaction data include details relating to the amount of the subsequent or recurring transaction, any data not stored at the transaction data storage database but is necessary for the electronic financial transaction system 120 to complete the transaction, and data for later reconciling the transaction at the payment administrator (e.g., a trace number, a transaction date, a transaction time, etc.). In general terms, the electronic financial transaction system 120 obtains the previously stored transaction data associated with the token, and implements the transaction with at least a portion of the stored transaction data.

During a subsequent or recurring transaction, the subsequent or recurring transaction data and the token are provided to the rules engine 353 similar to the set-up transaction. When the rules engine 353 receives the token, it recognizes that the transaction is a subsequent or recurring transaction. The rules engine 353 provides the token to the database engine 365, which obtains the previously provided set-up transaction data. If the stored transaction data includes encrypted data and no corresponding decrypted data was stored, then the encrypted data is decrypted as was discussed with the set-up transaction. In addition, the database engine 365 updates the stored transaction data to signify that the subsequent or recurring transaction is taking place. For example, if the transaction is a subsequent transaction, then the transaction data storage database 370 is updated to signify that the subsequent transaction has taken place. Similarly, if the transaction is a recurring transaction, then the transaction data storage database 370 is updated to signify that an additional recurring transaction has taken place.

Upon receiving the set-up transaction data, the rules engine 353 may compare some of the previously provided set-up transaction data with the newly provided transaction data. For example, the set-up transaction may include an amount parameter which is compared to the amount requested as part of the subsequent or recurring transaction. In addition, the rules engine 353 verifies that the transaction has not been completed (e.g., the subsequent transaction has not previously fulfilled). If the rules engine 353 determines an error has occurred, then appropriate parties are notified and the transaction is logged. For example, if a business entity is wrongfully requesting the electronic financial transaction system 120 to perform a subsequent transaction, then an electronic mail message is sent to the email address listed in the encrypted data (e.g., the presumed consumer email address).

Once the rules engine 353 receives the earlier provided set-up transaction data (including the decrypted data), the data is returned to the main processor 300 and is combined with the subsequent or recurring transaction data. Of course, any redundant data may be removed. The complete transaction data is then provided to the primary message control 310. The primary message control 310 analyzes the transaction data, identifies that the transaction is a subsequent or recurring transaction, and creates a request to the issuing FI. The request is created similar to the set-up request. However, the request includes an additional request for the issuing FI to debit or credit funds in the consumer's account. Once the request is created, the primary message control 310 creates a route for transmitting the request to the currency exchange communications processor 305.

The request is then provided to the currency exchange communications processor 305 via the main processor 300. The currency exchange communications processor 305 submits the request to the currency exchange network 125 and the request is transmitted to the issuing FI 130 as is known in the art.

Upon receiving the request, the issuing FI 130 verifies the existence of the consumer account, and debits or credits the account. A response is created by the issuing FI 130 that is returned to the currency exchange communications processor 305 via the currency exchange network 125. Upon receipt, the response is forwarded to the main processor 300 for analysis. If the removal of the funds is successful, then the main processor 300 informs the parties of the success, and logs the transaction for later settlement of funds and for billing purposes. At the end of an accounting period (e.g., at the end of each day), the logged transactions are netted and consolidated, and funds are transferred to and from the logged FIs as is known in the art.

If the removal of funds was unsuccessful (e.g., the request results in a non-sufficient funds result), then the proper parties are informed and the transaction is logged for billing purposes. In addition, the transaction data and the denial are provided to the financial data storage system 320 for updating the transaction data storage database 370. For example, if the transaction is a subsequent transaction and the consumer's account had insufficient funds, then the token stored in the transaction data storage database 370 is reactivated. The consumer may then add funds to the consumer's account and have the transaction resubmitted. Similarly, if the transaction is a recurring transaction with a limited number of recurring payments, then the stored transaction data may be updated to reflect a non-completed transaction.

In another embodiment of the invention, if the electronic financial transaction system 120 receives the response stating the removal of funds was successful, then the electronic financial transaction system 120 sends a separate request to the acquiring FI 135. The separate request asks the acquiring FI to add funds to the business entity's account. For this embodiment, the data relating to the business entity's account was provided either as part of the set-up transaction data and/or the subsequent or recurring transaction data.

As can be seen from the above, the invention provides a useful system and method of performing a financial transaction between a first entity and a second entity utilizing a third entity as a transaction facilitator. The system and method of the invention are useful in that they facilitate transactions between parties in a safe and secure manner without allowing the confidential information of one of the parties to be disclosed to another of the parties. As described herein, the system and method of the invention are useful to facilitate delayed and recurring payment transactions, to verify the consumer meets a predetermined requirement (e.g., an age requirement), and/or to determine the consumer's legal place of domicile. Various features and advantages of the invention are set forth in the following claims.

What is claimed is:

1. A computer-implemented method comprising:
   receiving, from a communications network by a computer at a transaction facilitator, a request for a token from a consumer computer, the request including:
      encrypted data,
      parameters associated with a financial transaction, comprising at least one of an identity of a business entity different from the transaction facilitator, a transaction date, or a transaction time, and
      transaction data associated with the consumer, comprising at least one identifier for the encrypted data;
   generating, by the computer at the transaction facilitator, the token identifying the transaction data, using the at least one identifier for the encrypted data;
   storing, by the computer at the transaction facilitator, the transaction data and the token, wherein storing comprises associating the transaction data with the token;
   providing, by the computer at the transaction facilitator, the token to the consumer computer;
   receiving, by the computer at the transaction facilitator, from the consumer computer, the token previously-generated by the transaction facilitator to initiate a financial transaction between the consumer and the business entity;
   obtaining, at the transaction facilitator, the stored transaction data identified by the token;
   verifying the transaction data meets a predetermined requirement; and
   initiating, by the computer at the transaction facilitator, the financial transaction between the consumer and the business entity and withholding at least a portion of the transaction data from the business entity.

2. The method of claim 1, the request for the token comprising at least one consumer supplied identifier for the encrypted data.

3. The method of claim 1, the consumer supplied encrypted data comprising encrypted financial account data.

4. The method of claim 3, the request for the token comprising a consumer supplied identifier for the encrypted financial account data.

5. The method of claim 3, the consumer supplied encrypted financial account data comprising an encrypted routing number for an issuing financial institution.

6. The method of claim 3, the consumer supplied encrypted financial account data comprising an encrypted account number at an issuing financial institution.

7. The method of claim 1, the consumer supplied encrypted data comprising encrypted consumer specific data relating to the consumer.

8. The method of claim 7, the request for the token comprising a consumer supplied identifier for the encrypted consumer specific data.

9. The method of claim 7, the encrypted consumer specific data comprising an encrypted date-of-birth of the consumer.

10. The method of claim 7, the consumer specific data comprising an encrypted electronic mail address of the consumer.

11. The method of claim 7, the consumer specific data comprising an encrypted mailing address of the consumer.

12. The method of claim 7, the consumer specific data comprising an encrypted state of residency of the consumer.

13. The method of claim 1, the consumer supplied encrypted data comprising a consumer supplied encrypted password.

* * * * *